US012760224B2

(12) United States Patent
Ferraris et al.

(10) Patent No.: US 12,760,224 B2
(45) Date of Patent: Oct. 13, 2026

(54) METHOD FOR OPERATING A COKE OVEN PLANT

(71) Applicant: PAUL WURTH S.A., Luxembourg (LU)

(72) Inventors: Alessio Ferraris, Grondona (IT); Riccardo Calcagno, Genoa (IT)

(73) Assignee: PAUL WURTH S.A., Luxembourg (LU)

( * ) Notice: Subject to any disclaimer, the term of this patent is extended or adjusted under 35 U.S.C. 154(b) by 215 days.

(21) Appl. No.: 18/700,123

(22) PCT Filed: Oct. 20, 2022

(86) PCT No.: PCT/EP2022/079312
§ 371 (c)(1),
(2) Date: Apr. 10, 2024

(87) PCT Pub. No.: WO2023/072742
PCT Pub. Date: May 4, 2023

(65) Prior Publication Data

US 2024/0417623 A1 Dec. 19, 2024

(30) Foreign Application Priority Data

Oct. 25, 2021 (LU) ........................................ 500783

(51) Int. Cl.
*C10B 21/10* (2006.01)
*B01D 53/14* (2006.01)
(Continued)

(52) U.S. Cl.
CPC .......... *C10B 21/10* (2013.01); *B01D 53/1475* (2013.01); *C10B 21/08* (2013.01); *C10K 1/005* (2013.01); *C10K 3/06* (2013.01)

(58) Field of Classification Search
CPC ..... C10B 21/08; C10B 21/10; C01B 53/1475; C10K 1/005; C10K 3/06
See application file for complete search history.

(56) References Cited

U.S. PATENT DOCUMENTS 3,192,127 A * 6/1965 Van Ackeren .......... C10B 21/10 432/2
4,061,544 A * 12/1977 van Ackeren ........... C10B 21/10 202/241
(Continued)

FOREIGN PATENT DOCUMENTS

| | | | |
|---|---|---|---|
| CN | 1779326 | A | 5/2006 |
| JP | 2006348063 | A | 12/2006 |
| JP | 2017189750 | A | 10/2017 |

OTHER PUBLICATIONS

ESPACENET Machine Translation of JP 2006348063 Obtained Jan. 16, 2026. (Year: 2026).*
(Continued)

*Primary Examiner* — Jonathan Miller
(74) *Attorney, Agent, or Firm* — CANTOR COLBURN LLP

(57) ABSTRACT

A method for operating a coke oven plant, comprising providing a blast furnace gas stream and a coke oven gas stream treating a part of the blast furnace gas stream in a CO converter unit to obtain a treated blast furnace gas stream, subjecting the treated blast furnace gas stream in a $CO_2$-depletion unit to obtain a primary $CO_2$-depleted blast furnace gas stream, mixing the primary $CO_2$-depleted blast furnace gas stream with a proportion of the blast furnace gas stream in a first mixing unit to obtain a secondary $CO_2$-depleted blast furnace gas stream, mixing the secondary $CO_2$-depleted blast furnace gas stream with a proportion of the coke oven gas stream in a second mixing unit to obtain a tertiary $CO_2$-depleted gas stream, feeding said tertiary
(Continued)

$CO_2$-depleted gas stream to an underfiring system of a coke oven from the coke oven plant to convert coal to coke thereby producing a coke oven gas and an exhaust gas, where properties of the secondary $CO_2$-depleted blast furnace gas stream are determined by a first analyzer downstream the first mixing unit are determined by properties of the tertiary $CO_2$-depleted gas stream in a second analyzer downstream the second mixing unit, where the proportion of the blast furnace gas stream and the proportion of the coke oven gas stream are controlled based on said properties determined by said first and second analyzers to adjust at least one of $CO_2$ content, CO content, $H_2$ content, Wobbe Index, stoichiometric combustion air demand and Lower Heating Value in said tertiary $CO_2$-depleted gas stream thereby controlling operation of the underfiring system.

18 Claims, 1 Drawing Sheet

(51) Int. Cl.

| | |
|---|---|
| ***C10B 21/08*** | (2006.01) |
| ***C10K 1/00*** | (2006.01) |
| ***C10K 3/06*** | (2006.01) |

(56) References Cited

U.S. PATENT DOCUMENTS

| | | | | |
|---|---|---|---|---|
| 4,363,654 | A * | 12/1982 | Frederick | C01B 3/36 75/496 |
| 10,072,312 | B2 * | 9/2018 | Grant | C21B 9/14 |
| 2012/0237421 | A1 * | 9/2012 | Millner | F25J 3/04084 423/220 |
| 2016/0068390 | A1 * | 3/2016 | Schneider | C01B 3/344 252/373 |
| 2017/0002434 | A1 * | 1/2017 | Grant | C21B 5/001 |
| 2022/0145410 | A1 * | 5/2022 | Kinzel | C21B 5/06 |

OTHER PUBLICATIONS

H.A.J. van Dijk. "Cost effective CO2 reduction in the Iron & Steel Industry by means of the SEWGS technology: STEPWISE Project ", 13th International Conference on Greenhouse GAs Control Technologies, GHGT-13, Nov. 14-18, 2016.

International Search Report for corresponding application PCT/EP2022/079312 filed Oct. 20, 2022; Mail date Feb. 6, 2023.

Written Opinion for corresponding application PCT/EP2022/079312 filed Oct. 20, 2022; Mail date Feb. 6, 2023.

* cited by examiner

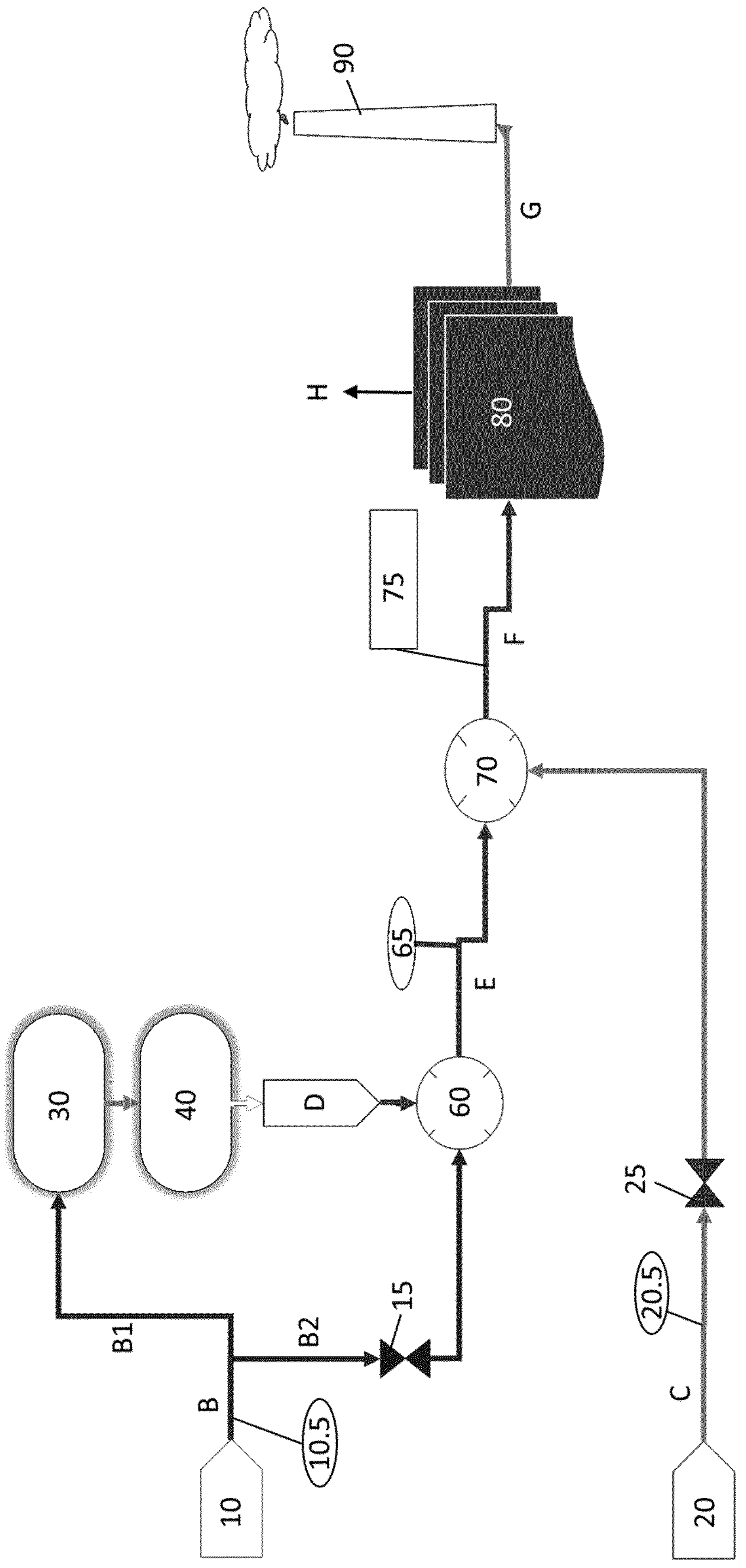
90
G
H
80
75
F
70
65
E
30
40
D
60
B1
B2
15
B
10.5
10
25
20.5
C
20

METHOD FOR OPERATING A COKE OVEN PLANT

TECHNICAL FIELD

The present disclosure generally relates to a method for operating a coke oven plant, as well as a corresponding coke oven plant.

BACKGROUND ART

As it is well known, modern cokemaking plants or coke oven plants are constructed in batteries that may contain from as few as ten to over 100 coke oven chambers. Because of the physical dimensions of the coking chambers (narrow, long and tall) they sometimes are referred to as slot ovens. The ovens are designed and operated to permit collection of the volatile products evolved from coal during the coking process. The coking process is typically operated in a cyclic manner, repeating the following main steps: charging; coking; and pushing (emptying).

The heat necessary for operating the coking process is generally provided by the combustion of combustible gases. While these gases may be of any appropriate nature, for economic reasons blast furnace gas can be used if available within the coke oven plant.

Moreover, as the operation of a blast furnace is complex and constantly requires to take into account many parameters and modifying input variables in order to produce pig iron of good quality and yield, the composition of the resulting blast furnace gas more or less strongly fluctuates over time.

Hence, the operation of coke oven heating/underfiring systems with blast furnace gas is far from ideal, not only because of its low calorific value, but also because of its strongly fluctuating composition.

BRIEF SUMMARY

A method is provided for operating a coke oven plant, which can be underfired with blast furnace gas, yet provide a better and more reliable heating in the underfiring system through the provision of a greatly enhanced and more flexible control of the underfiring gas, aiming in particular to keep the best combustion parameters and efficiency of the coke ovens at any time. Preferably, the method should not only be applicable to new coke oven plants, but also to existing plants.

DISCLOSURE

More particularly, a method is provided for operating a coke oven plant, the method comprising the steps of:

a) providing a blast furnace gas stream comprising carbon monoxide (CO), carbon dioxide ($CO_2$) and hydrogen ($H_2$), and a coke oven gas stream comprising hydrogen, carbon monoxide and methane ($CH_4$) (and other hydrocarbons);
b) treating (at least) a part of the blast furnace gas stream by converting carbon monoxide to carbon dioxide in a CO converter unit to obtain a treated blast furnace gas stream;
c) subjecting the treated blast furnace gas stream from step b) to a removal of carbon dioxide in a $CO_2$-depletion unit to obtain a primary $CO_2$-depleted blast furnace gas stream;
d) mixing the primary $CO_2$-depleted blast furnace gas stream from step c) with a proportion of the blast furnace gas stream in a first mixing unit to obtain a secondary $CO_2$-depleted blast furnace gas stream;
e) mixing the secondary $CO_2$-depleted blast furnace gas stream from step d) with a proportion of the coke oven gas stream in a second mixing unit to obtain a tertiary $CO_2$-depleted gas stream;
f) feeding said tertiary $CO_2$-depleted gas stream to an underfiring system of a coke oven from the coke oven plant to convert coal to coke, thereby producing a coke oven gas and an exhaust gas.

According to the disclosure, one or more properties of the secondary $CO_2$-depleted blast furnace gas stream are determined by a first analyzer downstream the first mixing unit and one or more properties of the tertiary $CO_2$-depleted gas stream are determined by a second analyzer downstream the second mixing unit. The proportion of the blast furnace gas stream and the proportion of the coke oven gas stream are controlled based on said properties determined by said first and second analyzers to adjust at least one of said one or more properties selected among $CO_2$ content (or concentration of $CO_2$), CO content (or concentration of CO), $H_2$ content (or concentration of $H_2$), Wobbe Index, stoichiometric combustion air/oxygen demand and Lower Heating Value in said tertiary $CO_2$-depleted gas stream thereby controlling operation of the underfiring system.

In a second aspect, the disclosure proposes a coke oven plant, preferably configured for implementing the method for operating a coke oven plant described herein, said coke oven plant comprising a) a source of blast furnace gas, in particular a blast furnace gas network, configured for providing a blast furnace gas stream comprising carbon monoxide CO, carbon dioxide $CO_2$ and hydrogen $H_2$, and a source of coke oven gas, in particular a coke oven gas network or the coke oven gas produced in the coke oven plant itself, configured for providing a coke oven gas stream comprising hydrogen $H_2$, carbon monoxide CO and methane $CH_4$ (and other hydrocarbons);
b) a CO converter unit fluidly connected to said source of blast furnace gas and configured for treating (at least) a part of the blast furnace gas stream by converting carbon monoxide to carbon dioxide to obtain a treated blast furnace gas stream;
c) a $CO_2$-depletion unit fluidly connected to said CO converter unit and configured for removing carbon dioxide from said treated blast furnace gas stream to obtain a primary $CO_2$-depleted blast furnace gas stream;
d) a first mixing unit fluidly connected to said $CO_2$-depletion unit and controllably fluidly connected to said source of blast furnace gas, said first mixing unit being configured for mixing the primary $CO_2$-depleted blast furnace gas stream from the $CO_2$-depletion unit with a proportion of the blast furnace gas stream to obtain a secondary $CO_2$-depleted blast furnace gas stream, said controllable fluidic connection to said source of blast furnace gas comprising a controllable blast furnace bypass stream regulator, such as a first controllable valve;
e) a second mixing unit fluidly connected to said first mixing unit and controllably fluidly connected to said source of coke oven gas, said second mixing unit being configured for mixing the secondary $CO_2$-depleted blast furnace gas stream from the first mixing unit with a proportion of the coke oven gas stream to obtain a tertiary $CO_2$-depleted gas stream, said controllable fluidic connection to said source of coke oven gas comprising a controllable coke oven gas stream regulator, such as a second controllable valve; and f) a coke oven from the coke oven plant comprising an underfiring system fluidly connected to said second mixing unit and configured for burning said tertiary $CO_2$-depleted gas stream to convert coal to coke thereby producing a coke oven gas and an exhaust gas.

The coke oven plant according to the disclosure further comprises a first analyzer downstream the first mixing unit (and upstream the second mixing unit) configured for determining one or more properties of the secondary $CO_2$-depleted blast furnace gas stream;

a second analyzer downstream the second mixing unit (and upstream the underfiring system) configured for determining one or more properties of the tertiary $CO_2$-depleted gas stream; and a control unit configured for controlling operation of the underfiring system by determining the proportion of the blast furnace gas stream and the proportion of the coke oven gas stream based on said properties provided by said first and second analyzers and by controlling the controllable blast furnace bypass stream regulator and the controllable coke oven gas stream regulator so as to adjust at least one of said one or more properties selected among $CO_2$ content (or concentration of $CO_2$), CO content (or concentration of CO), $H_2$ content (or concentration of $H_2$), Wobbe Index, stoichiometric combustion air/oxygen demand and Lower Heating Value in said tertiary $CO_2$-depleted gas stream.

Blast furnace gas (BFG), also referred to as top gas, is a by-product of blast furnace operation that is generated when the iron ore is reduced with coke to metallic iron. Blast furnace gas is mostly composed of nitrogen, carbon dioxide and carbon monoxide and some hydrogen. In conventional processes, blast furnace gas typically contains around 45-55% of $N_2$, around 15-25% of CO, around 15-25% of $CO_2$ and around 1-10% of $H_2$. Depending on the blast furnace operation or process, the volume fraction of carbon monoxide may become greater than 25%, whereas the volume fraction of hydrogen may become greater than 10%, reaching 15% of $H_2$, for instance in a blast furnace with natural gas injection.

Although blast furnace gas generally has a relatively low calorific value and although it is not an ideal gas, it can be used in an underfiring system of a coke oven (battery). A major drawback, aside from its generally poor calorific value, is that it is an unavoidable residual or byproduct from a metallurgic process, which process is operated to best produce pig iron, whatever the composition of this residual. Consequently, this composition may greatly vary in time based on the actual operating conditions of the blast furnace. Hence, the operation of the coke oven not only requires large amounts of blast furnace gas, but more importantly still: a stable and controlled operation is very difficult.

While it is known to lessen the problem of the poor calorific value of blast furnace gas by adding a certain proportion of coke oven gas, i.e. the gas produced during the coking operation itself, because this gas has a higher calorific value, this does not allow for significantly alleviating the variability of the blast furnace gas composition and thus of some of its properties relevant to its use in an underfiring system of a coke oven. To the contrary, coke oven gas is itself a byproduct whose composition may separately vary overtime, thereby potentially further exacerbating an unsteady operation of the underfiring system.

The inventors concluded that even a combined and controlled use of blast furnace gas and coke oven gas cannot reliably provide for a gas whose properties are both appropriate and sufficiently constant for an optimal operation of an underfiring system. However, the inventors found that both problems can be greatly reduced by eliminating a large proportion of $CO_2$ from a portion of the blast furnace gas, reducing the overall throughput, but leaving a greater proportion of calorific gases in the resulting stream. Moreover, the inventors identified that by proceeding that way, they would actually be able to benefit from a real and additional degree of freedom in the control of the properties of the underfiring gas, which would allow for an independent and thus more reliable control of different properties of the resulting gas. Indeed, the inventors not only recognized that a major factor of the fluctuations of the composition of the blast furnace gas is its varying contents of $CO_2$, but also that its (at least partial) removal would yield a gas with significantly different and desirable properties. Indeed, by depleting the blast furnace gas from preferably (essentially) all of its $CO_2$, not only the calorific value of the resulting gas is may be increased, but more particularly important properties of the resulting $CO_2$-depleted blast furnace gas are improved compared to the original blast furnace gas, e.g. its Wobbe Index is increased. The Wobbe Index is an important property of a combustible gas, as burners such as those used in the underfiring system are generally set to best work when this property is kept within a reasonable range.

The fact of now having two gases with very different properties, yet originating from the same inexpensive blast furnace gas, provides for a large and flexible spectrum of combinations by which better combustion parameters and efficiency of the coke oven can be achieved. Last but not least, it is a further significant advantage of the present disclosure, that these benefits may be obtained concomitantly to a significant reduction of $CO_2$ emissions at the exhaust stack of the coke oven.

Additionally, as the blast furnace gas also contains largely varying amounts of CO, it would be advantageous to also subtract this gas from the blast furnace gas. However, contrary to $CO_2$, CO is on the one hand more problematic as it is highly toxic and its removal would require significantly more stringent safety measures. Hence, the disclosure provides for the conversion of carbon monoxide to carbon dioxide by any appropriate process. The original $CO_2$ and the newly formed $CO_2$ can then be removed in a single operation by known methods as further detailed below. On the other hand, and again contrary to $CO_2$, CO still offers a certain calorific value, which could be valuably used downstream in the underfiring system. As will be further explained below, the CO to $CO_2$ conversion preferably used in benefic embodiments is a so-called water gas shift reaction. As will be understood by the skilled person, this will still further reduce $CO_2$ emissions at the exhaust stack of the coke oven.

Consequently, the present disclosure allows for an enhanced flexibility and reliability in the operation of the coke oven through a better control of the calorific fluctuations and of further properties, such as the Wobbe Index, by providing a secondary $CO_2$-depleted blast furnace gas, which is obtained by adding appropriate and controlled amounts of original, untreated blast furnace gas via the determination of suitable properties of the gas downstream the first mixing unit and bypassing appropriate amounts of untreated blast furnace gas to the first mixing unit. Preferably, corresponding properties of the blast furnace gas can either already be available, such as through a monitoring in the blast furnace gas network, or can be determined separately with a third analyzer and sent to the control unit for even more accurately reducing fluctuations of the properties of the tertiary $CO_2$-depleted stream.

Still further, at least the calorific value of the gas fed to the underfiring system is enhanced by foreseeing the introduction of a proportion of coke oven gas into the now combined at least partially $CO_2$-depleted blast furnace gas stream (i.e. the secondary $CO_2$-depleted blast furnace gas). Indeed, coke oven gas is generally formed by heating coal to 1100° C. in the absence of air/oxygen. A typical composition of coke oven gas comprises e.g. hydrogen ($H_2$—55%), methane ($CH_4$—24%), carbon monoxide (CO—8%), other hydrocarbons ($C_nH_m$—1.5—3%). Preferably, corresponding properties of the coke oven gas can either already be available, such as through a monitoring in the coke oven gas network, or can be determined separately with a fourth analyzer and sent to the control unit for even more accurately reducing fluctuations of the properties of the tertiary $CO_2$-depleted stream.

The overall monitoring and controlling of the method are done by continuously determining or monitoring of one or more properties of the secondary $CO_2$-depleted blast furnace gas stream (i.e. $CO_2$-depleted blast furnace gas mixed when needed with untreated blast furnace gas) and those of the tertiary $CO_2$-depleted gas stream (i.e. $CO_2$-depleted blast furnace gas mixed when needed with untreated blast furnace gas and coke oven gas) and by controlling or commanding stream regulators, such as controllable valves, placed within the blast furnace gas bypass and the coke oven gas feed. Of course, further points of monitoring and/or points of control can be provided if deemed necessary or helpful.

Advantageously, the proportion of the blast furnace gas stream and the proportion of the coke oven gas stream are controlled based on said properties determined by said first and second analyzers to adjust at least one of Wobbe Index and Lower Heating Value in said tertiary $CO_2$-depleted gas stream.

The Wobbe Index, generally noted $I_w$, is defined as follows (in MJ/Nm$^3$):

$$I_W = \frac{V_C}{\sqrt{G_S}},$$

if $V_C$ is the higher heating value (or higher calorific value) and $G_S$ is the specific gravity and $$G_S = \frac{\rho_{STP}}{\rho_{air,STP}} = \frac{M}{M_{air}}$$

wherein $\rho_{STP}$ is the density of the gas at standard conditions (0° C., 101.325 kPa), $\rho_{air,STP}$ is the density of air at standard conditions, M is the molar mass of the gas and $M_{air}$ is the molar mass of air which is about 28.96 kg/kmol.

The Lower Heating Value (LHV; net calorific value; NCV, or lower calorific value; LCV) is a measure of available thermal energy produced by a combustion of a fuel, measured as a unit of energy per unit mass or volume of substance, such as in kJ/Nm$^3$, assuming that the water component of a combustion process remains in vapor state at the end of combustion. Hence, the LHV is generally defined as the amount of heat released by the combustion when the products are cooled to 150° C., meaning that the latent heat of vaporization of water (and possibly other reaction products) is not recovered.

In a nutshell, the disclosure allows for a significantly enhanced and reliable control of the operation of a coke oven underfiring system by allowing to flexibly adjust within significantly larger ranges important properties of the underfiring gas, such as the Wobbe Index, by the provision and the controlled combination of two different gases from the same blast furnace gas and to further adjust other properties of the underfiring gas, such as its Lower Heating Value, by adding coke oven gas as needed or desirable. Moreover, these benefits are achieved together with a significant reduction of the carbon footprint of the overall coking process.

Preferably, the proportion of the blast furnace gas stream and the proportion of the coke oven gas stream are specifically or chiefly controlled to reduce fluctuations in the operation of the underfiring system.

In advantageous embodiments, the fluctuations in one or more properties, selected among $CO_2$ content, CO content, $H_2$ content, stoichiometric combustion air/oxygen demand, Wobbe Index and Lower Heating Value, of the tertiary $CO_2$-depleted stream is reduced by at least 5%, preferably by at least 10%, more preferably by at least 20% compared to the fluctuations of the same one or more properties of the blast furnace gas from the blast furnace gas source or network.

Alternatively or additionally, the proportion of the blast furnace gas stream and the proportion of the coke oven gas stream are specifically or chiefly controlled to keep the Wobbe Index close to a target value and/or to raise the Lower Heating Value of blast furnace gas.

In advantageous embodiments, the Wobbe Index of the tertiary $CO_2$-depleted stream is controlled to be within a range of +/−20%, preferably +/−15%, more preferably +/−10% of a preset/target value of Wobbe Index (specific to the underfiring system).

In further advantageous embodiments, the Lower Heating Value of the tertiary $CO_2$-depleted stream is raised by at least 10%, preferably by at least 20%, more preferably by at least 30% compared to the LHV of the blast furnace gas from the blast furnace gas source or network. Hence, typically the LHV of the tertiary $CO_2$-depleted stream, regulated to be within a range of 3700 to 5300 kJ/Nm$^3$, preferably within a range of 4100 to 5000 kJ/Nm$^3$.

Alternatively or additionally, the proportion of the blast furnace gas stream and the proportion of the coke oven gas stream are specifically or chiefly controlled to reduce $CO_2$ content in the exhaust gas, i.e. to reduce carbon footprint of the coking process.

In still further advantageous embodiments, the $CO_2$ footprint of the coke oven exhaust gas is reduced by at least 30%, preferably by at least 60%, more preferably by at least 90% compared to the $CO_2$ footprint of the same exhaust gas when operated without $CO_2$-depletion (i.e. only blast furnace gas from the blast furnace gas source through the bypass and coke oven gas), all other conditions being the same.

As already briefly mentioned above, in preferred embodiments, the method comprises, in step b), the treating of (at least) part of the blast furnace gas stream in the CO converter unit implementing a water gas shift reaction, wherein CO is converted in the presence of water (vapor) to $CO_2$ and hydrogen. Hence, in the coke oven plant, the CO converter unit preferably comprises a water gas shift reactor. In such cases, the generation of further hydrogen adds to the calorific value of the resulting gas, while still allowing the removal of the CO, now converted to $CO_2$.

The removal of carbon dioxide in the $CO_2$-depletion unit can be done using any known and appropriate method, such as one or more steps of chemical absorption and/or of physical adsorption. Preferably, the $CO_2$-depletion step comprises one or more of physical adsorption and/or chemical absorption, such as Pressure Swing Adsorption (PSA), Vacuum Pressure Swing Adsorption (VPSA), capture with washing liquid(s), etc.

The $CO_2$-depletion unit may e.g. comprise an absorber unit and a stripper unit. In the absorber, a washing liquid (such as e.g. an aqueous amine solution) absorbs $CO_2$ (and possibly other acid gases, such as $H_2S$) from the blast furnace gas. The washing liquid enriched in absorbed $CO_2$ can then be routed into a stripper, where it is heated up. Thereby, the washing liquid releases the absorbed $CO_2$ and the washing liquid may be reused in the absorber. The released $CO_2$ is recovered, stored and can be used for other purposes.

The washing liquid may be any washing liquid suitable for the removal of $CO_2$ from gas. For example, the washing may comprise a solution of monoethanolamine (MEA), diethanolamine (DEA), methyldiethanolamine (MDEA), diisopropylamine (DIPA) and/or diglycolamine (DGA).

Pressure swing adsorption (PSA) is a technique used to separate some gas species from a mixture of gases under pressure according to the species' molecular characteristics and affinity for an adsorbent material. It operates at near-ambient temperature. Selective adsorbent materials (e.g., zeolites, activated carbon, etc.) are used as trapping material, preferentially adsorbing the target gas species at high pressure. The process then swings to low pressure to desorb the adsorbed gas. Vacuum pressure swing adsorption (VPSA) segregates gases from a gaseous mixture at near ambient pressure; the process then swings to a vacuum to regenerate the adsorbent material.

In certain embodiments, a water gas shift reaction (step b)) can be combined with pressure swing adsorption (step c)) in a so-called sorption enhanced water gas shift (SEWGS) reactor, e.g. a multi-bed pressure swing adsorption (PSA) unit in which the vessels are filled with the water gas shift catalyst and the $CO_2$ adsorbent material. SEWGS reactors combine catalyzed water gas shift reaction and solid sorbent-based $CO_2$ separation, e.g. K-promoted hydrotalcite adsorbent to effect both CO conversion and $CO_2$ capture within a single unit.

In the context of the disclosure, steps b) and/or c) may not only be combined in a single stage or apparatus, each step may alternatively comprise more than one treatment, in series or parallel, of the same type or of a different type if needed or desired.

In still further advantageous embodiments, the stoichiometric combustion air demand or requirement or the stoichiometric combustion oxygen demand (i.e. the amount of air or oxygen required for achieving maximum combustion efficiency) are determined at least by said second analyzer to allow for controlling the amount of oxygen or air fed to the underfiring system.

In the context of the present disclosure, the terms "$CO_2$-depleted" or "$CO_2$-depletion" in the context of a blast furnace gas is used to designate such a gas whose $CO_2$ concentration has been reduced (or the action of reducing said concentration) compared to the original blast furnace gas provided by the source of blast furnace gas, such as the blast furnace gas network or the blast furnace directly from the top of a blast furnace. After removal of $CO_2$, the blast furnace gas may still contain a residual concentration of $CO_2$. Accordingly, "$CO_2$-depleted blast furnace gas" generally means "blast furnace gas with low concentration of $CO_2$". In particular, the removal of carbon dioxide in the $CO_2$-depletion unit is such that the $CO_2$ content or concentration in the primary $CO_2$-depleted blast furnace gas stream is at most 10 vol.-%, generally at most 7.5 vol.-%, preferably at most 5 vol.-%, more preferably at most 2.5 vol.-%.

Hence, in a still further aspect, the disclosure proposes the use of a method for operating a coke oven plant as described herein or the use of such a coke oven plant for reducing fluctuations in the operation of the underfiring system heated with blast furnace gas.

Alternatively or additionally, the disclosure proposes the use of a method for operating a coke oven plant as described herein or the use of such a coke oven plant for keeping the Wobbe Index close to a preset or target value and for raising the Lower Heating Value of blast furnace gas.

Alternatively or additionally, the disclosure proposes the use of a method for operating a coke oven plant as described herein or the use of such a coke oven plant for reducing (non-renewable) $CO_2$ content in the exhaust gas, i.e. for reducing the $CO_2$ footprint of the exhaust gas or of the overall coking process.

The method and coke oven plant according to one or more of the embodiments described herein realize at least some the following results and benefits:

$CO_2$ footprint reductions from 30% up to 90% and above at the stack of the coke oven plant.

The $CO_2$ final emission can be adjusted in accordance to the thermal regulation of a new or of an existing coke oven battery, keeping the best combustion conditions in the heating flues, regulating the LHV of input gas to coke oven gas and/or the Wobbe Index, through the by-pass and regulations as described herein.

A dedicated control unit/automation system (integrated in the existing automation or as standalone module) can manage the set points or target values, in order to fit the best combustion conditions and/or the minimum $CO_2$ emissions.

Standard instrumentation is mostly sufficient to analyze and provide the data necessary to calculate online the characteristics of the streams necessary to evaluate the optimum set point of the regulation loops.

A dedicated automation module may be provided to record the thermal gas input continuously and will adjust the set points of the regulator valves in order to keep the necessary thermal input to the battery, adjusting the LHV of coke oven gas to input gas and the Wobbe Index according results of the combustion. The $CO_2$-depleted blast furnace gas stream flowrate can be adjusted to get both minimum $CO_2$ emissions at stack and efficient combustion keeping under control the Wobbe Index and the minimum LHV at regenerative heating system.

The $CO_2$-depleted blast furnace gas stream can be used as is as an alternative to conventional blast furnace gas only heating, having in any case a higher LHV and an adjusted Wobbe Index compared to upstream blast furnace gas and producing lower $CO_2$ emissions than in pure blast furnace gas and mixed gas cases.

Even more, in case of temporary unavailability of $CO_2$-depletion unit, the coke oven battery does not need to be stopped, but can be fed through the blast furnace gas bypass, together with coke oven gas enrichment.

The method of the disclosure can be implemented both in a new coke oven plant and in existing ones, thereby offering a cost-efficient way to upgrade existing plants and allowing a new flexibility in operation, better control and efficiency of the underfiring system and/or reduced $CO_2$ emissions.

The method of operating a coke plant disclosed herein allows for the flexible management of the different streams by algorithms aiming to optimize at least one of $CO_2$ emissions (by favoring the primary $CO_2$-depleted BFG stream in the first mixing unit), combustion parameters of the coke oven (by stabilizing the Wobbe Index or by adjusting the LHV in the tertiary $CO_2$-depleted stream) and/or stabilization of thermal input (by reducing the fluctuations of the one or more properties, such as Wobbe Index and/or LHV, in the tertiary $CO_2$-depleted stream).

Finally, it is a particular advantage of the disclosure, that it can be implemented both in a new or in an existing coke oven plant.

BRIEF DESCRIPTION OF THE DRAWINGS

A preferred embodiment will now be described, by way of example, with reference to the accompanying drawing in which:

FIG. 1 is a schematic view of an embodiment of a (part of a) coke oven plant.

Further details and advantages of the present disclosure will be apparent from the following detailed description of several not limiting embodiments with reference to the attached drawing.

DESCRIPTION OF PREFERRED EMBODIMENTS

An embodiment of the method of operating a coke oven plant, or of an embodiment of such a coke oven plant itself, is schematically represented in FIG. 1.

A coke oven or coke oven battery 80 is fed with a coke oven feeding stream which is a so-called tertiary $CO_2$-depleted stream F, which is produced from mainly a(n initial) blast furnace gas (BFG) stream B from a BFG source, such as a BFG network 10, and a proportion of coke oven gas (COG) stream C from a COG source, such as a COG network or using the coke oven gas stream H directly from the coke oven.

As can be seen in FIG. 1, part B1, i.e. a first part, of the BFG stream B is first fed to a CO converter unit 30 to convert at least part, preferably essentially all, such as >90 mol.-%, preferably >95 mol.-%, more preferably >99 mol.-%, of the carbon monoxide CO contained in the BFG to carbon dioxide. Advantageously, the CO converter unit comprises a water gas shift reactor to convert CO in the presence of water vapor to $CO_2$ and $H_2$. The CO conversion not only reduces significantly the content of toxic CO and not only allows its removal together with the original $CO_2$ in the following step, but it also allows for recovering the energy still contained in the CO by the generation of additional hydrogen.

The resulting treated BFG thereafter enters a $CO_2$-depletion unit 40 to capture and remove most of the $CO_2$ (original and produced by CO converter unit 30). The capture and removal may be made by any suitable technique, such as one or more of physical adsorption and/or chemical absorption processes, e.g. Pressure Swing Adsorption (PSA), Vacuum Pressure Swing Adsorption (VPSA) and capture with washing liquid(s). The overall reduction in $CO_2$ depends on the initial contents of CO and $CO_2$, on the processes used both in the CO converter unit and in the $CO_2$-depletion unit. Generally however, reductions of more than 85%, more preferably more than 90%, or even above 95% in the $CO_2$ footprint can be achieved within the primary $CO_2$-depleted BFG stream leaving the $CO_2$-depletion unit as compared to the initial BFG B (or B1 or B2).

The resulting primary $CO_2$-depleted BFG stream D is thereafter fed to a first mixing unit 60, where it is or can be mixed with a proportion B2, i.e. a second part, of initial BFG if needed to adjust one or more of its properties, such as $CO_2$ content, CO content, $H_2$ content, Wobbe Index and Lower Heating Value. The adjustment of these one or more properties is controlled by a control unit (not shown) based on the measurement of these properties made by a first analyzer 65 located downstream the first mixing unit 60 and by controlling the amount of BFG B2 added to the first mixing unit 60 via the BFG bypass line by acting on the BFG bypass stream regulator 15, which may be e.g. a controllable valve. The BFG treatment stream, i.e. part B1, and the BFG bypass stream, i.e. proportion B2, add up to the total quantity of BFG stream B.

The control of BFG bypass stream regulator 15 may be made to predominantly use $CO_2$-depleted BFG by favoring the use of the primary $CO_2$-depleted BFG stream D, thereby significantly reducing the overall content of $CO_2$ in the exhaust G at the stack 90 of the coke oven 80. Alternatively, the control of BFG bypass stream regulator 15 may be made to predominantly reduce the fluctuations of one or more of the above-mentioned properties by adjusting the flow through the bypass line to best straighten said property or properties, at least as long as this is possible within the rates of mixing streams B2 and D. The control of BFG bypass stream regulator 15 can of course also be made to best compromise between reducing the overall content of $CO_2$ in the exhaust G and reducing the fluctuations.

Even with the reduction in the fluctuation of said one or more properties, which can be achieved by using at least some primary $CO_2$-depleted BFG stream D instead of only initial BFG B2 stream, it will generally be necessary or desirable to further controllably add a proportion of coke oven gas for these same reasons, i.e. reducing fluctuation and/or raising the calorific value of the gas stream D.

Hence, the primary $CO_2$-depleted BFG stream E leaving the first mixing unit 60 is fed to a second mixing unit 70 together with a proportion of coke oven gas GOG stream C, said proportion being controllable through COG stream regulator 25. Again, the control of said regulator is advantageously made based on one or more of the aforementioned properties determined by the second analyzer 75 downstream of the second mixing unit 70.

Likewise, the control of COG stream regulator 25 may be made to predominantly use secondary $CO_2$-depleted BFG E, thereby "keeping" the reduction in the overall content of $CO_2$ in the exhaust G at the stack 90 of the coke oven 80. Alternatively, the control of COG stream regulator 25 may be made to predominantly reduce the fluctuations of one or more of the above-mentioned properties within the tertiary $CO_2$-depleted stream by adjusting the flow from the COG stream C to best straighten said property or properties, at least as long as this is possible within the rates of mixing streams C and E. Again, the control of COG stream regulator 25 can of course also be made to best compromise between reducing the overall content of $CO_2$ in the exhaust G and reducing said fluctuations.

If necessary or desirable, further analyzers may be provided, such as a third analyzer 10.5 determining the one or more properties of the initial BFG stream B and/or a fourth analyzer 20.5 determining the one or more properties of the COG stream C. The values of the determined properties can be fed to the control unit to further improve the control of the composition, and thus of the properties, of the tertiary $CO_2$-depleted stream which will be fed to the underfiring system of the coke oven 80.

In the coke oven (battery), coal is converted to coke with the heat produced by the underfiring system burning the tertiary $CO_2$-depleted stream F. The combustion produces an exhaust stream G and the coking operation produces a coke oven gas H, which as mentioned earlier, can be used as source of COG in COG stream C.

As an example of what can be achieved with the present disclosure, reference is made to the following table, which shows some ameliorations when operating according to the disclosure (Tertiary $CO_2$-depleted gas) as compared to operating with mixed BFG and COG without $CO_2$-depletion (conventional Mixed blast furnace gas and coke oven gas): while the LHV can be reasonably raised, the $CO_2$ emissions at the stack can be significantly reduced.

TABLE

| Coke oven battery underfiring | | |
|---|---|---|
| Case | LHV of underfiring gas kJ/Nm$^3$ | $CO_2$ emissions at stack kg $CO_2$/t coke |
| Mixed blast furnace gas and coke oven gas (not according to the disclosure) | 3000-5000 Normal: 4200 | 675-1254 |
| Tertiary $CO_2$-depleted gas (according to the disclosure) | 3700-5000 Normal: 4200 | 80-300 |

The invention claimed is:

1. A method for operating a coke oven plant, the method comprising the steps of:

a) providing a blast furnace gas stream comprising carbon monoxide CO, carbon dioxide $CO_2$ and hydrogen $H_2$, and a coke oven gas stream comprising hydrogen $H_2$, carbon monoxide CO and methane $CH_4$;

b) treating a part of the blast furnace gas stream by converting carbon monoxide to carbon dioxide in a CO converter unit to obtain a treated blast furnace gas stream;

c) subjecting the treated blast furnace gas stream from step b) to a removal of carbon dioxide in a $CO_2$-depletion unit to obtain a primary $CO_2$-depleted blast furnace gas stream;

d) mixing the primary $CO_2$-depleted blast furnace gas stream from step c) with a proportion of the blast furnace gas stream in a first mixing unit to obtain a secondary $CO_2$-depleted blast furnace gas stream;

e) mixing the secondary $CO_2$-depleted blast furnace gas stream from step d) with a proportion of the coke oven gas stream in a second mixing unit to obtain a tertiary $CO_2$-depleted gas stream;

f) feeding said tertiary $CO_2$-depleted gas stream to an underfiring system of a coke oven from the coke oven plant to convert coal to coke thereby producing a coke oven gas and an exhaust gas;

wherein properties of the secondary $CO_2$-depleted blast furnace gas stream are determined by a first analyzer downstream the first mixing unit and properties of the tertiary $CO_2$-depleted gas stream are determined by a second analyzer downstream the second mixing unit; wherein the proportion of the blast furnace gas stream and the proportion of the coke oven gas stream are controlled based on said properties determined by said first and second analyzers to adjust at least one of $CO_2$ content, CO content, $H_2$ content, Wobbe Index, stoichiometric combustion air demand and Lower Heating Value in said tertiary $CO_2$-depleted gas stream thereby controlling operation of the underfiring system.

2. The method as claimed in claim 1, wherein the proportion of the blast furnace gas stream and the proportion of the coke oven gas stream are controlled based on said properties determined by said first and second analyzers to adjust at least one of Wobbe Index and Lower Heating Value in said tertiary $CO_2$-depleted gas stream.

3. The method as claimed in claim 1, wherein the proportion of the blast furnace gas stream and the proportion of the coke oven gas stream are controlled to reduce fluctuations in the operation of the underfiring system.

4. The method as claimed in claim 1, wherein the proportion of the blast furnace gas stream and the proportion of the coke oven gas stream are controlled to reduce $CO_2$ content in the exhaust gas and/or $CO_2$ footprint of the exhaust gas.

5. The method as claimed in claim 1, wherein the proportion of the blast furnace gas stream and the proportion of the coke oven gas stream are controlled to achieve a target value of Wobbe Index and/or to raise the Lower Heating Value of the tertiary $CO_2$-depleted gas stream.

6. The method as claimed in claim 5, wherein the Wobbe Index of the tertiary $CO_2$-depleted stream is controlled to be within a range of +/−20% of a preset target value of Wobbe Index.

7. The method as claimed in claim 5, wherein the Wobbe Index of the tertiary $CO_2$-depleted stream, regulated to be within a range of 3.5 to 7 MJ/Nm$^3$.

8. The method as claimed in claim 5, wherein the Lower Heating Value of the tertiary $CO_2$-depleted stream is raised by at least 10% compared to the Lower Heating Value of the blast furnace gas from the blast furnace gas source.

9. The method as claimed in claim 5, wherein the Lower Heating Value of the tertiary $CO_2$-depleted stream is controlled to be within a range of 3700 to 5300 KJ/Nm$^3$.

10. The method as claimed in claim 1, wherein, in step b), the treating of the part of the blast furnace gas stream in the CO converter unit comprises a water gas shift reaction.

11. The method as claimed in claim 1, wherein, in step c), the removal of carbon dioxide in the $CO_2$-depletion unit comprises one or more of physical adsorption and/or chemical absorption.

12. The method as claimed in claim 1, wherein both steps b) and c) are effected in a sorption enhanced water gas shift reactor.

13. The method as claimed in claim 1, wherein, in step c), the removal of carbon dioxide in the $CO_2$-depletion unit is such that the $CO_2$ content of the primary $CO_2$-depleted blast furnace gas stream is at most 7.5 vol.-%.

14. A coke oven plant comprising a) a source of blast furnace gas configured for providing a blast furnace gas stream comprising carbon monoxide CO, carbon dioxide $CO_2$ and hydrogen $H_2$, and a source of coke oven gas configured for providing a coke oven gas stream comprising hydrogen $H_2$, carbon monoxide CO and methane $CH_4$;

b) a CO converter unit connected to said source of blast furnace gas and configured for treating a part of the blast furnace gas stream by converting carbon monoxide to carbon dioxide to obtain a treated blast furnace gas stream;

c) a $CO_2$-depletion unit connected to said CO converter unit and configured for removing carbon dioxide from said treated blast furnace gas stream to obtain a primary $CO_2$-depleted blast furnace gas stream;

d) a first mixing unit connected to said $CO_2$-depletion unit and controllably connected to said source of blast furnace gas, said first mixing unit being configured for mixing the primary $CO_2$-depleted blast furnace gas stream from the $CO_2$-depletion unit with a proportion of the blast furnace gas stream to obtain a secondary $CO_2$-depleted blast furnace gas stream, said controllable connection to said source of blast furnace gas comprising a controllable blast furnace bypass stream regulator;

e) a second mixing unit connected to said first mixing unit and controllably connected to said source of coke oven gas, said second mixing unit being configured for mixing the secondary $CO_2$-depleted blast furnace gas stream from the first mixing unit with a proportion of the coke oven gas stream to obtain a tertiary $CO_2$-depleted gas stream, said controllable connection to said source of coke oven gas comprising a controllable coke oven gas stream regulator;

f) a coke oven from the coke oven plant comprising an underfiring system connected to said second mixing unit and configured for burning said tertiary $CO_2$-depleted gas stream to convert coal to coke thereby producing a coke oven gas and an exhaust gas;

wherein the coke oven plant further comprises a first analyzer downstream the first mixing unit configured for determining properties of the secondary $CO_2$-depleted blast furnace gas stream and a second analyzer downstream the second mixing unit configured for determining properties of the tertiary $CO_2$-depleted gas stream; a control unit configured for controlling operation of the underfiring system by determining the proportion of the blast furnace gas stream and the proportion of the coke oven gas stream based on said properties provided by said first and second analyzers and by controlling the controllable blast furnace bypass stream regulator and the controllable coke oven gas stream regulator so as to adjust at least one of $CO_2$ content, CO content, $H_2$ content, Wobbe Index, stoichiometric combustion air demand and Lower Heating Value in said tertiary $CO_2$-depleted gas stream.

15. The coke oven plant as claimed in claim 14, wherein the CO converter unit comprises a water gas shift reactor.

16. The coke oven plant as claimed in claim 14, wherein the $CO_2$-depletion unit comprises one or more of physical adsorption device and/or chemical absorption device.

17. The coke oven plant as claimed in claim 14, wherein both CO converter unit and $CO_2$-depletion unit are formed by a sorption enhanced water gas shift reactor.

18. The coke oven plant as claimed in claim 14, wherein the $CO_2$-depletion unit is operated such that the $CO_2$ content of the primary $CO_2$-depleted blast furnace gas stream is at most 7.5 vol.-%.

* * * * *